US006995708B2

(12) United States Patent
Schmidt

(10) Patent No.: US 6,995,708 B2
(45) Date of Patent: Feb. 7, 2006

(54) LOCAL POSITIONING SYSTEM

(75) Inventor: Dominik J. Schmidt, Palo Alto, CA (US)

(73) Assignee: Gallitzin Allegheny LLC, Los Altos, CA (US)

( * ) Notice: Subject to any disclaimer, the term of this patent is extended or adjusted under 35 U.S.C. 154(b) by 107 days.

(21) Appl. No.: 10/196,968

(22) Filed: Jul. 17, 2002

(65) Prior Publication Data

US 2004/0056798 A1    Mar. 25, 2004

(51) Int. Cl.
*H04B 7/185* (2006.01)
*G01S 3/02* (2006.01)

(52) U.S. Cl. ............... 342/357.14; 342/463; 342/464
(58) Field of Classification Search .......... 342/357.14, 342/357.1, 450, 457, 463, 464

See application file for complete search history.

(56) References Cited

U.S. PATENT DOCUMENTS

| 6,032,247 A * | 2/2000 | Asghar et al. ............ 712/35 |
| 6,246,376 B1 * | 6/2001 | Bork et al. ............ 342/357.13 |
| 6,313,787 B1 * | 11/2001 | King et al. ............ 342/357.1 |
| 6,329,948 B1 * | 12/2001 | Ishikawa ............ 342/357.14 |
| 6,424,297 B2 * | 7/2002 | Tamura et al. ......... 342/357.14 |
| 6,768,909 B1 * | 7/2004 | Irvin ............ 455/456.1 |
| 2002/0019698 A1 * | 2/2002 | Vilppula et al. ....... 342/357.08 |
| 2002/0025828 A1 * | 2/2002 | Turetzky et al. ........... 455/456 |
| 2003/0005214 A1 * | 1/2003 | Chan ............ 711/104 |
| 2003/0078037 A1 * | 4/2003 | Auckland et al. .......... 455/422 |
| 2003/0085837 A1 * | 5/2003 | Abraham ............ 342/357.15 |

OTHER PUBLICATIONS

M.V. Clark et al., Outdoor IEEE 802.11 cellular networks: radio link performance, IEEE International Conference on Communications, vol. 1, p. 512-516, Apr./May 2002.*
IEEE Std 802.11, 1999 Edition, Part 11: Wireless LAN Medium Access Control (MAC) and Physical Layer (PHY) Specifications p. 1 and 148, 1999.*
A. Ward, Getting Connected (Global Networking), Communicate, Sep. 2001.*

* cited by examiner

*Primary Examiner*—Thomas H. Tarcza
*Assistant Examiner*—Fred H. Mull

(57) ABSTRACT

A method to determine position of a user includes sniffing for one or more earth-based media; and if the one or more earth-based media exists, using an earth-based positioning system (PS) receiver associated with one of the media and otherwise using a satellite-based PS receiver.

19 Claims, 6 Drawing Sheets

Is receiver in a Bluetooth PAN with Bluetooth GPS signals

If yes, enable Bluetooth GPS receiver

Is receiver in an 802.11 LAN with 802.11 GPS signals

If yes, enable 802.11 GPS receiver

Is receiver in a WLAN with WLAN GPS signals

If yes, enable WLAN GPS receiver

Enable satellite-based GPS receiver

FIG. 1E

LOCAL POSITIONING SYSTEM

The present invention relates to a positioning system.

Radio communication systems generally provide two-way voice and data communication between remote locations. Examples of such systems are cellular and personal communication system (PCS) radio systems, trunked radio systems, dispatch radio networks, and global mobile personal communication systems (GMPCS) such as satellite-based systems. Communication in these systems is conducted according to a pre-defined standard. Mobile stations, also known as handsets, portables or radiotelephones, conform to the system standard to communicate with one or more fixed base stations.

It is desirable to obtain and communicate physical locations of mobile stations within a system, such as radiotelephone handsets within a cellular system. In addition, the United States Federal Communications Commission (FCC) has required that cellular handsets must be geographically locatable by the year 2001. This capability is desirable for emergency systems such as Enhanced 911 (E911). The FCC requires stringent accuracy and availability performance objectives and demands that cellular handsets be locatable within 100 meters 67% of the time for network based solutions and within 50 meters 67% of the time for handset based solutions. Further, with location information available for mobile stations, position-dependent services and messaging including advertising can be tailored to the handset user responsive to the location of the handset.

As discussed in U.S. Pat. No. 6,313,787, current generations of radio communication have limited mobile station location determination capability. Conventionally, each mobile station is equipped with a receiver suitable for use with a global satellite navigation system such as the Global Positioning System (GPS). The GPS receiver detects transmissions from a constellation of GPS satellites orbiting the Earth. Using data and timing from the transmissions, the GPS receiver calculates the positions of the satellites and from those positions, its own position. A GPS satellite in orbit moves at about 4,000 meters per second. The satellite has location data defined by a parameter X(t) and velocity data defined by a parameter V(t). The parameters X(t) and V(t) are three-dimensional position and velocity vectors for this satellite and are referenced to an earth-centered, earth-fixed Cartesian coordinate system. The GPS system includes 24 satellites, several of which may be in view of the mobile station at any one time. Each satellite broadcasts data according to pre-defined standard formats and timings.

Traditionally, the satellite coordinates and velocity have been computed inside the GPS receiver. The receiver obtains satellite ephemeris and clock correction data by demodulating the satellite broadcast message stream. The satellite transmission contains 576 bits of data transmitted at 50 bits per second (bps). The constants contained in the ephemeris data coincide with Kepler orbit constants requiring many mathematical operations to turn the data into position and velocity data. In one implementation, this conversion requires 90 multiplies, 58 adds and 21 transcendental function calls (sin, cos, tan) in order to translate the ephemeris into a satellite position and velocity vector at a single point, for one satellite. Most of the computations require double precision, floating point processing. A receiver must perform this computation every second for every satellite, for up to twelve satellites. Thus, the computational load for performing the traditional calculation is significant. The handset must include a high-level processor capable of the necessary calculations. Such processors are relatively expensive and consume large amounts of power. As a portable device for consumer use, a mobile station is preferably inexpensive and operates at very low power. These design goals are inconsistent with the high computational load required for GPS processing. Further, conventional GPS systems do not operate well inside buildings due to signal obstruction.

In another trend, the number of products incorporating the recently approved Bluetooth wireless standard is expected to explode during the first couple years of the new millennium. Bluetooth, which establishes wireless connections between devices such as mobile phones, PDAs, and headsets, operates at relatively low data rates over short distances using very little power. On the other hand, IEEE 802.11 is a wireless LAN standard approved by IEEE a couple years ago and operates at higher data rates over longer distances using more power. Companies today are strongly benefiting from using 802.11-compliant wireless LANs to support efficient mobile communications between handheld data collectors and corporate IS databases.

SUMMARY

Systems and methods are disclosed for determining the position of a user. The system sniffs for one or more earth-based media; and if the one or more earth-based media exists, uses signals from an earth-based positioning system (PS) receiver associated with one of the media and otherwise uses signals from a satellite-based PS receiver.

In another aspect, a method to determine position of a user includes enabling a Bluetooth positioning receiver if a Bluetooth personal area network (PAN) is accessible; otherwise enabling an 802.11 positioning receiver if an 802.11 local area network (LAN) is accessible; otherwise enabling a cellular positioning receiver if a cellular signal is accessible; and otherwise enabling a global positioning system (GPS) receiver.

Advantages of the system may include one or more of the following. The system allows a user get positioning signals even if the user is inside a building where conventional satellite positioning signals cannot get through.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1E shows a process to provide GPS data.

DESCRIPTION

Figure 1A:
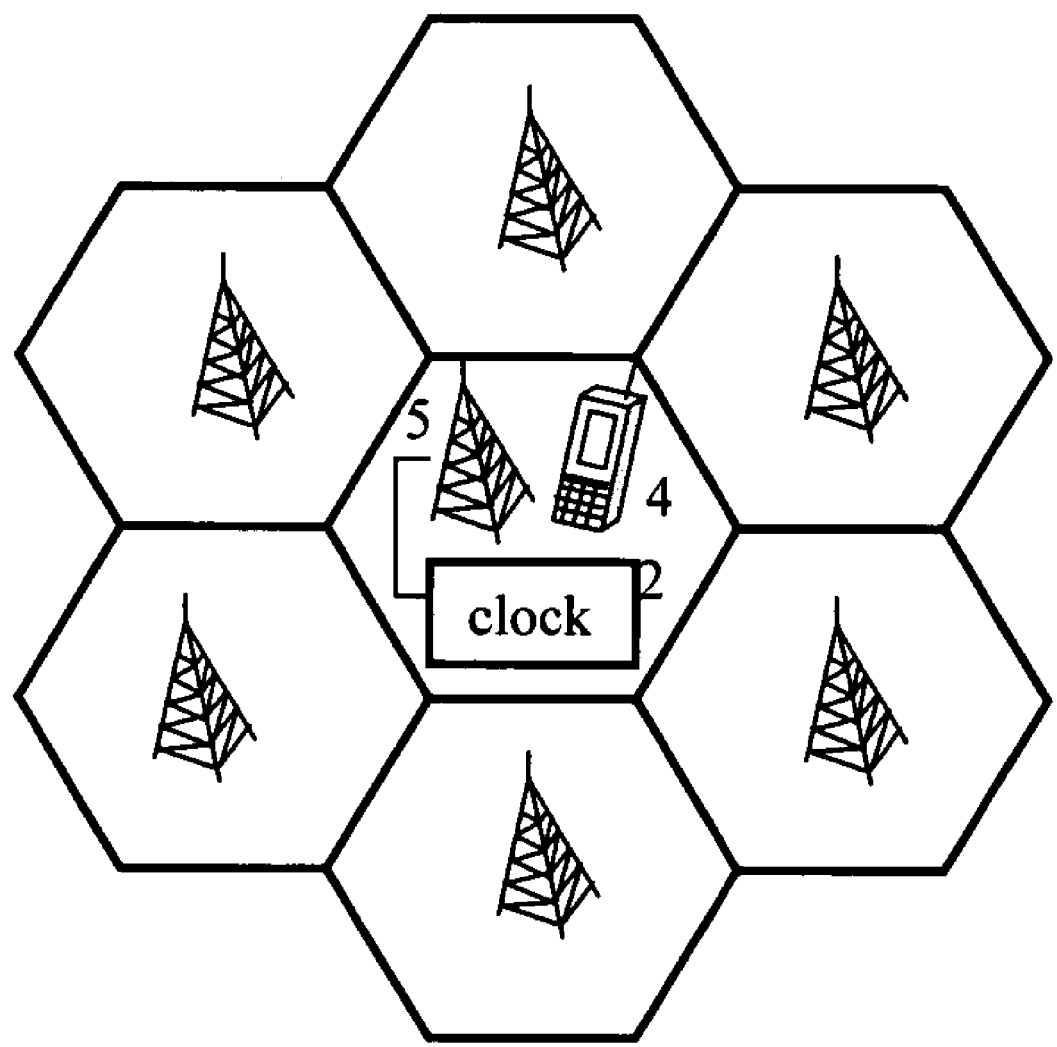
FIGS. 1A–1D show various embodiments of a GPS.

Referring to FIG. 1A, one embodiment of a terrestrial GPS is shown. In this system, a handheld device such as a telephone or digital assistant 4 communicates with a cellular tower 5. The cellular tower 5 receives a precise clock from a clock source 2, which can be an atomic clock. The tower 5 transmits its physical position and the time generated by the clock source 2 to the handheld device 4. The handheld device 4 also receives transmissions from towers located in nearby cells, and based on information from at least four cells, the handheld device 4 computes its position using conventional GPS algorithms. In this embodiment, GPS transmitters on a plurality of towers send out radio signals to a GPS receiver in the handheld device 4 that measures the amount of time it takes for the signal to travel from the GPS transmitters to the receiver. The earth's atmosphere slows the transmission of the signal according to the particular conditions at that atmospheric location, the angle at which the signal enters it, and so on. The GPS receiver guesses the actual speed of the signal using complex mathematical models of a wide range of atmospheric conditions. The towers can also transmit additional information to the receiver such as weather conditions. In this manner, the receiver uses terrestrial propagation speed of radio waves to determine how far the radio waves traveled by figuring out how long it took for them to arrive.

Figure 1B:
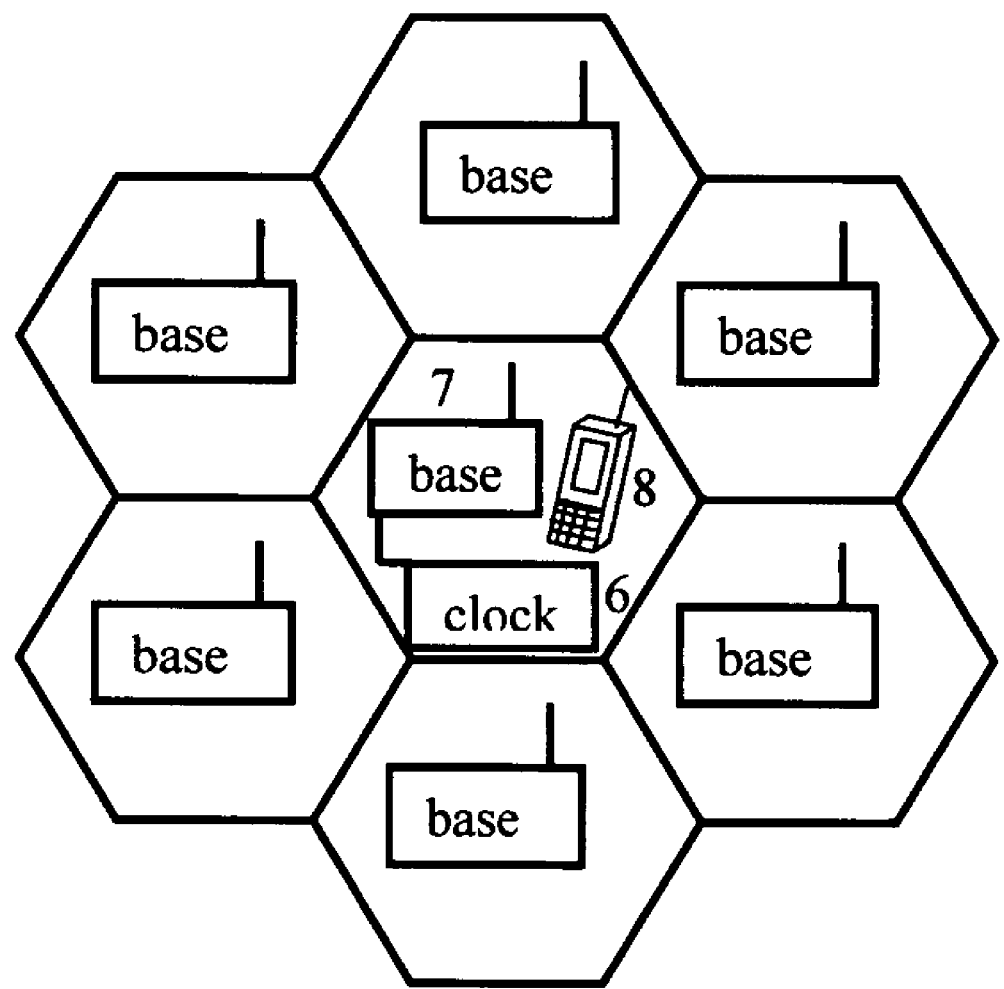

Turning now to FIG. 1B, a second embodiment of the terrestrial GPS is detailed. In this system, a handheld device such as a telephone or digital assistant 8 communicates with a base station 7. The base station 7 receives a precise clock from a clock source 6, which can be an atomic clock. The base station 7 transmits its physical position and the time generated by the clock source 6 to the handheld device 8. The handheld device 8 also receives transmissions from base stations located in nearby cells, and based on information from at least four cells, the handheld device 8 computes its position using conventional GPS algorithms. In this embodiment, GPS transmitters on a plurality of base stations send out radio signals to a GPS receiver that measures the amount of time it takes for the signal to travel from the GPS transmitters to the receiver. The earth's atmosphere slows the transmission of the signal according to the particular conditions at that atmospheric location, the angle at which the signal enters it, and so on. The GPS receiver guesses the actual speed of the signal using complex mathematical models of a wide range of atmospheric conditions. The base stations can also transmit additional information to the receiver. In this manner, the receiver uses known terrestrial propagation speed of radio waves to determine how far the radio waves traveled by figuring out how long it took for them to arrive.

The base stations can be 802.11 wireless base stations or Bluetooth base stations, among others. Each base station either contains an atomic clock or can electronically access an atomic clock. The base stations send radio signals to GPS receivers so that the receivers can find out how far away each base station is. Because the base stations are local, the signals are relatively strong by the time they reach the receiver. That means the receiver does not need to be outside or be in a fairly open area for the GPS receiver to work. The GPS receiver picks up the transmissions of at least four base stations and combines the information in those transmissions with information in an electronic almanac, so that it can mathematically determine the receiver's position. The basic information a receiver provides, then, is the latitude, longitude and altitude (or some similar measurement) of its current position. The receiver can combine this data with other information, such as satellite-based GPS data, to make the receiver more accurate. Certain embodiments of the receiver can store maps in the receiver's memory, access a computer that can hold more detailed maps in its memory and graphically display the current position using the receiver's latitude and longitude readouts.

Figure 1C:
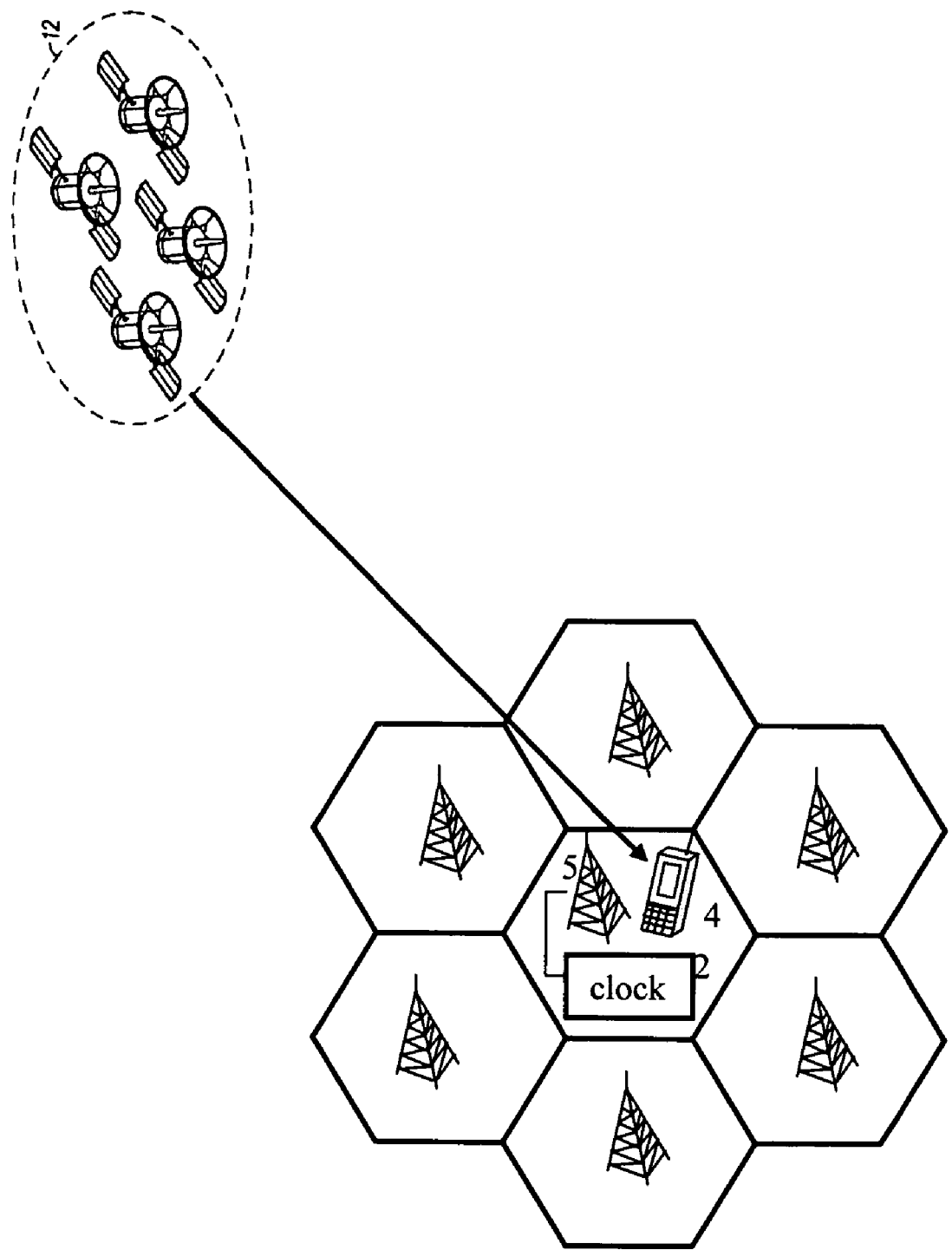

FIG. 1C shows a third embodiment that uses a combination of towers and satellite based GPS systems to improve accuracy. In this system, a handheld device such as a telephone or digital assistant 10 communicates with a base station 11. The base station 11 receives a precise clock from a clock source 9, which can be an atomic clock. The base station 11 transmits its physical position and the time generated by the clock source 9 to the handheld device 10. The handheld device 10 also receives transmissions from base stations located in nearby cells, and based on information from at least four cells, the handheld device 10 computes its position using conventional GPS algorithms to determine positions, particularly when the handheld device 10 is inside buildings where satellite GPS signals have difficulty penetrating. When the handheld device 10 roams outside of the base stations, the device 10 can switch to the satellite GPS signals from an array of satellites 12. In this embodiment, at least four stations and up to twenty four stations are visible to the GPS receiver.

Figure 1D:
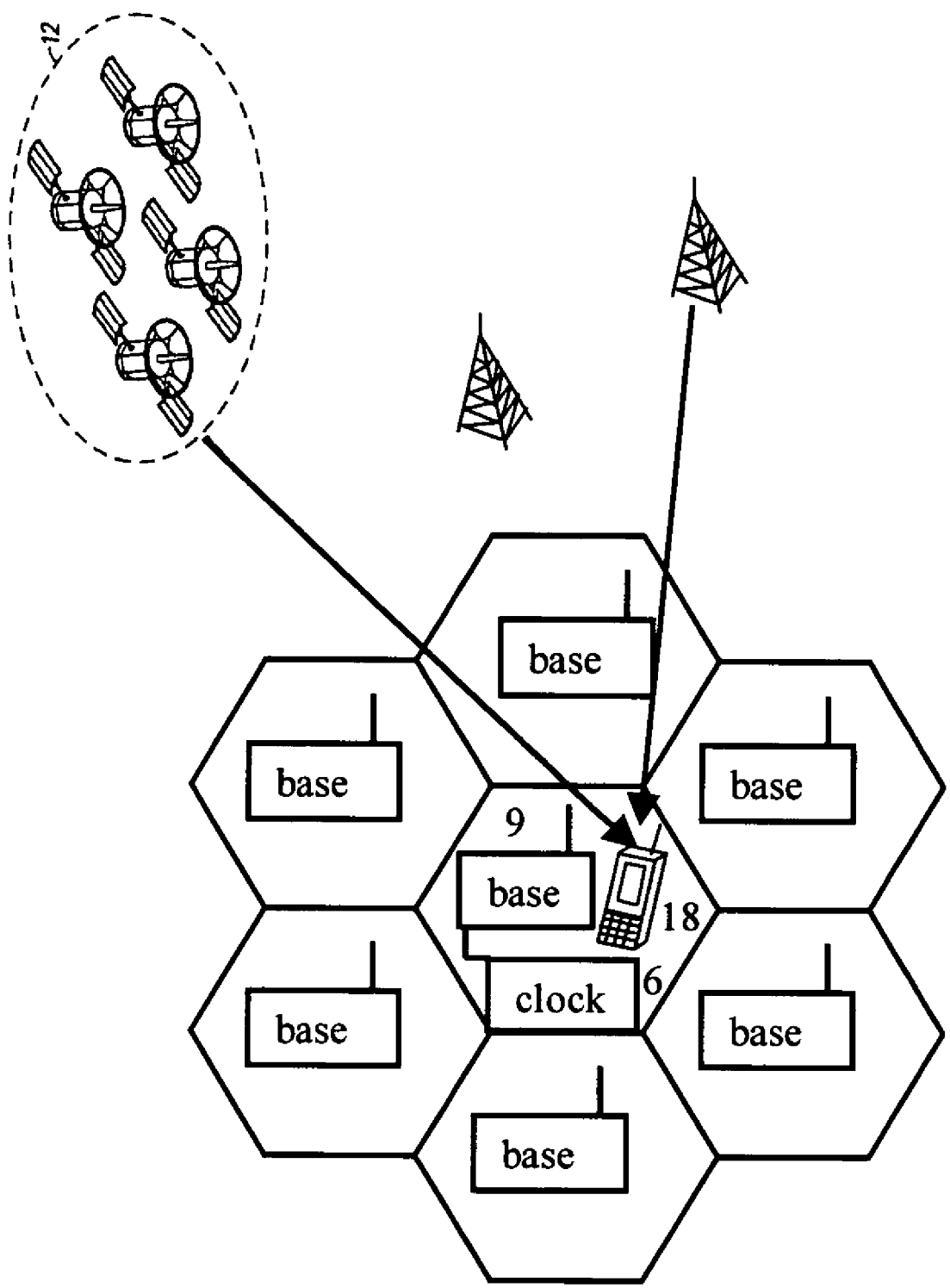

The positioning signals can be further multiplexed to provide a high degree of positioning accuracy, regardless of physical structures that can block GPS reception. FIG. 1D shows a universal GPS unit 13 capable of decoding a plurality of positioning systems can be used. In this system, the universal GPS unit 13 communicates with the base station 9 that receives the precise clock from the clock source 6. The unit 13 also receives transmissions from base stations located in nearby cells, and based on information from at least four cells, the unit 13 computes its position using conventional GPS algorithms. The unit 13 also receives positioning signals from a plurality of towers 14 and 16. Additionally, the unit 13 also receives GPS signals from the array of satellites 12.

Figure 2:
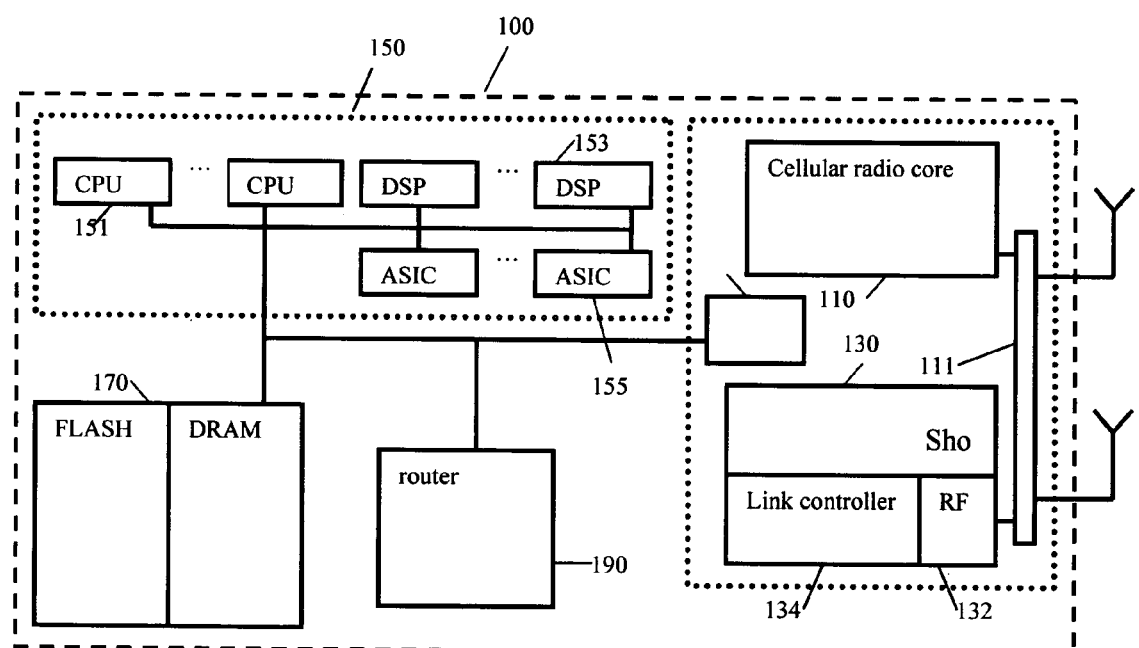
FIG. 2 shows a block diagram of a multi-mode wireless communicator device fabricated on a single silicon integrated chip.

The universal GPS unit 13 can decode Bluetooth GPS transmissions, 802.11 GPS transmissions, cell phone GPS transmissions, and satellite based GPS transmissions. The universal GPS unit 13 first determines whether Bluetooth GPS signals are present and if not, the universal GPS unit searches for an 802.11 GPS signal. If neither are present, the universal GPS unit searches for cell-phone GPS transmissions. The use of local GPS signals enable the universal GPS unit 13 to access positioning systems even when the GPS unit is indoor. Also, due to the fixed location of the base stations, the GPS signals can be determined with accuracy. When no terrestrial GPS signals are present, the universal GPS unit 13 searches for satellite-based GPS signals. If the satellite-based signal is undetectable, the GPS unit 13 indicates that it failed to lock onto a positioning signal. Pseudocode for the above process is shown below as FIG. 1E Is receiver in a Bluetooth PAN with Bluetooth GPS signals
   If yes, enable Bluetooth GPS receiver
Is receiver in an 802.11 LAN with 802.11 GPS signals
   If yes, enable 802.11 GPS receiver
Is receiver in a WLAN with WLAN GPS signals
   If yes, enable WLAN GPS receiver
Enable satellite-based GPS receiver FIG. 2 shows a block diagram of a multi-mode wireless communicator device 100 fabricated on a single silicon integrated chip. In one implementation, the device 100 is an integrated CMOS device with radio frequency (RF) circuits, including a cellular radio core 110, a plurality of short-range wireless transceiver cores 130 that can include Bluetooth cores and 802.11 cores, and a sniffer 111, along side digital circuits, including a reconfigurable processor core 150, a high-density memory array core 170, and a router 190. The high-density memory array core 170 can include various memory technologies such as flash memory and dynamic random access memory (DRAM), among others, on different portions of the memory array core.

The reconfigurable processor core 150 can include one or more processors 151 such as MIPS processors and/or one or more digital signal processors (DSPs) 153, among others. The reconfigurable processor core 150 has a bank of efficient processors 151 and a bank of DSPs 153 with embedded functions. These processors 151 and 153 can be configured to operate optimally on specific problems and can include buffers on the receiving end and buffers on the transmitting end such the buffers shown in FIG. 1. For example, the bank of DSPs 153 can be optimized to handle discrete cosine transforms (DCTs) or Viterbi encodings, among others. Additionally, dedicated hardware 155 can be provided to handle specific algorithms in silicon more efficiently than the programmable processors 151 and 153. The number of active processors is controlled depending on the application, so that power is not used when it is not needed. This embodiment does not rely on complex clock control methods to conserve power, since the individual clocks are not run at high speed, but rather the unused processor is simply turned off when not needed.

Through the router 190, the multi-mode wireless communicator device 100 can detect and communicate with any wireless system it encounters at a given frequency. The router 190 performs the switch in real time through an engine that keeps track of the addresses of where the packets are going. The router 190 can send packets in parallel through two or more separate pathways. For example, if a Bluetooth™ connection is established, the router 190 knows which address it is looking at and will be able to immediately route packets using another connection standard. In doing this operation, the router 190 working with the RF sniffer 111 periodically scans its radio environment ('ping') to decide on optimal transmission medium. The router 190 can send some packets in parallel through both the primary and secondary communication channel to make sure some of the packets arrive at their destinations.

The reconfigurable processor core 150 controls the cellular radio core 110 and the short-range wireless transceiver cores 130 to provide a seamless dual-mode network integrated circuit that operates with a plurality of distinct and unrelated communications standards and protocols such as Global System for Mobile Communications (GSM), General Packet Radio Service (GPRS), Enhance Data Rates for GSM Evolution (Edge) and Bluetooth™. The cell phone core 110 provides wide area network (WAN) access, while the short-range wireless transceiver cores 130 support local area network (LAN) access. The reconfigurable processor core 150 has embedded read-only-memory (ROM) containing software such as IEEE 802.11, GSM, GPRS, Edge, and/or Bluetooth™ protocol software, among others.

In one embodiment, the cellular radio core 110 includes a transmitter/receiver section that is connected to an off-chip antenna (not shown). The transmitter/receiver section is a direct conversion radio that includes an I/Q demodulator, transmit/receive oscillator/clock generator, multi-band power amplifier (PA) and PA control circuit, and voltage-controlled oscillators and synthesizers. In another embodiment of the transmitter/receiver section, intermediate frequency (IF) stages are used. In this embodiment, during cellular reception, the transmitter/receiver section converts received signals into a first intermediate frequency (IF) by mixing the received signals with a synthesized local oscillator frequency and then translates the first IF signal to a second IF signal. The second IF signal is hard-limited and processed to extract an RSSI signal proportional to the logarithm of the amplitude of the second IF signal. The hard-limited IF signal is processed to extract numerical values related to the instantaneous signal phase, which are then combined with the RSSI signal.

For voice reception, the combined signals are processed by the processor core 150 to form PCM voice samples that are subsequently converted into an analog signal and provided to an external speaker or earphone. For data reception, the processor simply transfers the data over an input/output (I/O) port. During voice transmission, an off-chip microphone captures analog voice signals, digitizes the signal, and provides the digitized signal to the processor core 150. The processor core 150 codes the signal and reduces the bit-rate for transmission. The processor core 150 converts the reduced bit-rate signals to modulated signals such as I,I,Q,Q modulating signals, for example. During data transmission, the data is modulated and the modulated signals are then fed to the cellular telephone transmitter of the transmitter/receiver section.

Turning now to the short-range wireless transceiver core 130, the short-range wireless transceiver core 130 contains a radio frequency (RF) modem core 132 that communicates with a link controller core 134. The processor core 150 controls the link controller core 134. In one embodiment, the RF modem core 132 has a direct-conversion radio architecture with integrated VCO and frequency synthesizer. The RF-unit 132 includes an RF receiver connected to an analog-digital converter (ADC), which in turn is connected to a modem performing digital modulation, channel filtering, AFC, symbol timing recovery, and bit slicing operations. For transmission, the modem is connected to a digital to analog converter (DAC) that in turn drives an RF transmitter.

The link controller core 134 provides link control function and can be implemented in hardware or in firmware. One embodiment of the core 134 is compliant with the Bluetooth™ specification and processes Bluetooth™ packet types. For header creation, the link controller core 134 performs a header error check, scrambles the header to randomize the data and to minimize DC bias, and performs forward error correction (FEC) encoding to reduce the chances of getting corrupted information. The payload is passed through a cyclic redundancy check (CRC), encrypted/scrambled and FEC-encoded. The FEC encoded data is then inserted into the header.

In one exemplary operating sequence, a user is in his or her office and browses a web site on a portable computer through a wired local area network cable such as an Ethernet cable. Then the user walks to a nearby cubicle. As the user disconnects, the device 100 initiates a short-range connection using a Bluetooth™ connection. When the user drives from his or her office to an off-site meeting, the Bluetooth™ connection is replaced with cellular telephone connection. Thus, the device 100 enables easy synchronization and mobility during a cordless connection, and open up possibilities for establishing quick, temporary (ad-hoc) connections with colleagues, friends, or office networks. Appliances using the device 100 are easy to use since they can be set to automatically find and contact each other when within range.

When the multi-mode wireless communicator device 100 is in the cellular telephone connection mode, the short-range wireless transceiver cores 130 are powered down to save power. Unused sections of the chip are also powered down to save power. Many other battery-power saving features are incorporated, and in particular, the cellular radio core 110 when in the standby mode can be powered down for most of the time and only wake up at predetermined instances to read messages transmitted by cellular telephone base stations in the radio's allocated paging time slot.

When the user arrives at the destination, according to one implementation, the cellular radio core 110 uses idle time between its waking periods to activate the short-range wireless transceiver cores 130 to search for a Bluetooth™ channel or an 802.11 signal, for example. If Bluetooth™ signals are detected, the phone sends a deregistration message to the cellular system and/or a registration message to the Bluetooth™ system. Upon deregistration from the cellular system, the cellular radio core 110 is turned off or put into a deep sleep mode with periodic pinging and the short-range wireless transceiver core 130 and relevant parts of the synthesizer are powered up to listen to the Bluetooth™ or the 802.11 channel.

According to one implementation, when the short-range wireless core 130 in the idle mode detects that the short-range signals such as the 802.11 and/or Bluetooth™ signals have dropped in strength, the device 100 activates the cellular radio core 110 to establish a cellular link, using information from the latest periodic ping. If a cellular connection is established and 802.11 and/or Bluetooth™ signals are weak, the device 100 sends a deregistration message to the 802.11 and/or Bluetooth™ system and/or a registration message to the cellular system. Upon registration from the cellular system, the short-range transceiver cores 130 is turned off or put into a deep sleep mode and the cellular radio core 110 and relevant parts of the synthesizer are powered up to listen to the cellular channel.

The router 190 can send packets in parallel through the separate pathways of cellular or 802.11 and/or Bluetooth™. For example, if a Bluetooth™ connection is established, the router 190 knows which address it is looking at and will be able to immediately route packets using the Bluetooth standard. Similarly, if the 802.11 connection is established, the router 190 uses this connection standard. In doing this operation, the router 190 pings its environment to decide on optimal transmission medium. If the signal reception is poor for both pathways, the router 190 can send some packets in parallel through both the primary and secondary communication channel (cellular and/or Bluetooth™) to make sure some of the packets arrive at their destinations. However, if the signal strength is adequate, the router 190 prefers the 802.11 and/or Bluetooth™ mode to minimize the number of subscribers using the capacity-limited and more expensive cellular system at any give time. Only a small percentage of the device 100, those that are temporarily outside the 802.11 and/or Bluetooth coverage, represents a potential load on the capacity of the cellular system, so that the number of mobile users can be many times greater than the capacity of the cellular system alone could support.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. For example, although exemplary embodiments using Bluetooth, 802.11, GSM, GPRS, and EDGE are contemplated, the invention is applicable to other forms of data transmission, include radio-based and optical-based transmission techniques.

What is claimed is:

1. A method to determine position of a user, comprising:
    sniffing for one or more earth-based media with a mobile device; and
    if the one or more earth-based media is present, using an earth-based positioning system (PS) receiver of the mobile device selected from one of a short-range wireless receiver of the mobile device and a cellular receiver of the mobile device to determine the position, otherwise using a satellite-based PS receiver of the mobile device to determine the position only if the one or more earth-based media are not present, using code of the mobile device to fix the mobile device to favor use of the earth-based PS receiver over the satellite-based PS receiver.

2. The method of claim 1, wherein using the earth-based PS receiver further comprises using one of a BLUETOOTH™ receiver, an 802.11 receiver, and a cellular receiver on a single integrated circuit of the mobile device, the integrated circuit including a processor.

3. The method of claim 2, further comprising selecting the BLUETOOTH™ receiver or the 802.11 receiver over the cellular receiver.

4. The method of claim 1, further comprising selecting the earth-based PS receiver over the satellite-based PS receiver to reduce power consumption.

5. The method of claim 1, further comprising powering down the cellular receiver if the short-range wireless receiver is operating.

6. The method of claim 1, further comprising activating the cellular receiver and establishing a cellular link only if a strength of received short-range wireless signals is inadequate.

7. The method of claim 1, wherein the code is not user alterable.

8. A method to determine position of a user, comprising:
    enabling a first positioning receiver on an integrated circuit (IC) having a processor core including a digital signal processor (DSP) and a central processor, to determine the position if a first wireless personal area network (PAN) is accessible;
    otherwise enabling a second positioning receiver on the IC to determine the position if a second wireless local area network (LAN) is accessible;
    otherwise enabling a cellular positioning receiver on the IC to determine the position if a cellular signal is accessible; and
    enabling a satellite-based global positioning system (GPS) receiver on the IC to determine the position only if the first wireless PAN, the second wireless LAN and the cellular signal are not accessible, wherein code executed on the IC fixes the IC to favor an earth-based positioning receiver over the satellite-based GPS receiver.

9. The method of claim 8, wherein the second wireless LAN conforms to an 802.11 specification.

10. The method of claim 8, wherein the first wireless PAN conforms to a BLUETOOTH™ specification.

11. The method of claim 8, further comprising enabling one of the first positioning receiver, the second positioning receiver, and the cellular positioning receiver over the satellite-based GPS receiver to reduce power consumption.

12. The method of claim 8, further comprising powering down the cellular positioning receiver if the first positioning receiver or the second positioning receiver is operating.

13. A system comprising:
    a reconfigurable processor core including a digital signal processor (DSP) and a central processor on an integrated circuit (IC);
    first and second communication channels on the IC coupled to the reconfigurable processor core, the first communication channel comprising a short-range wireless channel and the second communication channel comprising a cellular channel;
    a sniffer on the IC to sniff for one or more earth-based media; and
    a storage on the IC coupled to the reconfigurable processor core, the storage containing instructions that fix operation of the system to determine position using an earth-based media, if present, otherwise to determine position using a satellite-based media.

14. The system of claim 13, wherein the storage further comprises instructions to fix operation of the system to enable a first positioning receiver on the integrated circuit (IC) to determine the position if a first wireless personal area network (PAN) is accessible, otherwise to enable a second positioning receiver on the IC to determine the position if a second wireless local area network (LAN) is accessible, otherwise to enable a cellular positioning receiver on the IC to determine the position if a cellular signal is accessible, and otherwise to enable a satellite-based global positioning system (GPS) receiver on the IC to determine the position.

15. The system of claim 13, wherein the system comprises a universal positioning system to receive signals from a plurality of base stations, a plurality of cellular units, and a plurality of satellites.

16. The system of claim 15, wherein the universal positioning system comprises a plurality of receivers having different protocols on a single integrated circuit.

17. The system of claim 13, wherein the reconfigurable processor core comprises a plurality of processors, and at least one digital signal processor (DSP).

18. The system of claim 17, wherein at least one unused processor is to be powered off.

19. The system of claim 13, further comprising a router coupled to the first and second communication channels to transmit packets in parallel through the first and second communication channels, wherein the first and second communication channels to transmit the packets via different communication protocols.

* * * * *